(12) United States Patent
Ono et al.

(10) Patent No.: US 10,829,078 B2
(45) Date of Patent: Nov. 10, 2020

(54) AIRBAG DEVICE

(71) Applicants: TOYODA GOSEI CO., LTD., Kiyosu (JP); SUBARU CORPORATION, Tokyo (JP)

(72) Inventors: Minoru Ono, Kiyosu (JP); Tetsuya Ogata, Kiyosu (JP); Akihiro Terauchi, Tokyo (JP)

(73) Assignees: TOYODA GOSEI CO., LTD., Aichi-pref. (JP); SUBARU CORPORATION, Tokyo (JP)

( * ) Notice: Subject to any disclaimer, the term of this patent is extended or adjusted under 35 U.S.C. 154(b) by 80 days.

(21) Appl. No.: 16/106,182

(22) Filed: Aug. 21, 2018

(65) Prior Publication Data

US 2019/0054886 A1    Feb. 21, 2019

(30) Foreign Application Priority Data

Aug. 21, 2017    (JP) ................... 2017-158571

(51) Int. Cl.
    B60R 21/2165    (2011.01)
    B60R 21/206     (2011.01)
    B60R 21/00      (2006.01)

(52) U.S. Cl.
    CPC ........ B60R 21/2165 (2013.01); B60R 21/206 (2013.01); *B60R 2021/0004* (2013.01); *B60R 2021/0053* (2013.01)

(58) Field of Classification Search
    CPC .............. B60R 21/2165; B60R 21/206; B60R 2021/0004; B60R 2021/0053

(Continued)

(56) References Cited

U.S. PATENT DOCUMENTS 6,631,920 B1 * 10/2003 Webber ................ B60R 21/206
                                                            280/730.1
7,434,837 B2 * 10/2008 Hotta ................... B60R 21/206
                                                               280/729

(Continued)

FOREIGN PATENT DOCUMENTS

JP     2004-106560 A    4/2004
JP     2005-271774 A    10/2005

(Continued)

OTHER PUBLICATIONS

Machine Translation of WO2016099669 (Year: 2013).*
Office Action dated Aug. 21, 2020 issued in corresponding CN patent application No. 201810953281.0 (and English translation).

*Primary Examiner* — Paul N Dickson
*Assistant Examiner* — Kurtis Nielson
(74) *Attorney, Agent, or Firm* — Posz Law Group, PLC

(57) ABSTRACT

An airbag device includes: a case which stores an inflatable airbag, which includes a peripheral wall section around a protruding opening; an airbag cover which covers the protruding opening, and which includes a side wall section connected to the peripheral wall section; and an exposed connection portion which serves as a connection portion between the side wall section and the peripheral wall section. At the exposed connection portion, the peripheral wall section includes an engaging hook, and the side wall section includes an engaging hole. At the peripheral edge of the engaging hole, a first rib capable of covering the tip end section of the engaging hook protrudes so as to have a height dimension nearly equal to or more than a height dimension of the tip end section of the engaging hook which protrudes from the engaging hole.

9 Claims, 9 Drawing Sheets

(58) Field of Classification Search
USPC .................................................... 280/728.3
See application file for complete search history.

(56) References Cited

U.S. PATENT DOCUMENTS

| | | | |
|---|---|---|---|
| 2003/0132618 A1* | 7/2003 | Suzuki | B60R 21/2165 |
| | | | 280/730.1 |
| 2004/0075253 A1 | 4/2004 | Morita | |
| 2005/0140123 A1 | 6/2005 | Hotta et al. | |
| 2006/0202448 A1* | 9/2006 | Sawada | B60R 21/2155 |
| | | | 280/728.3 |
| 2007/0200322 A1 | 8/2007 | Sakakida | |
| 2010/0066064 A1* | 3/2010 | Kotikovsky | B60R 7/06 |
| | | | 280/728.3 |
| 2010/0127482 A1* | 5/2010 | Onohara | B60R 21/045 |
| | | | 280/728.2 |
| 2014/0008899 A1* | 1/2014 | Vigeant | B60R 21/206 |
| | | | 280/730.1 |

FOREIGN PATENT DOCUMENTS

| | | | |
|---|---|---|---|
| JP | 2007-230344 A | 9/2007 | |
| WO | WO-2013099669 A1 * | 7/2013 | ........... B60R 21/206 |

\* cited by examiner

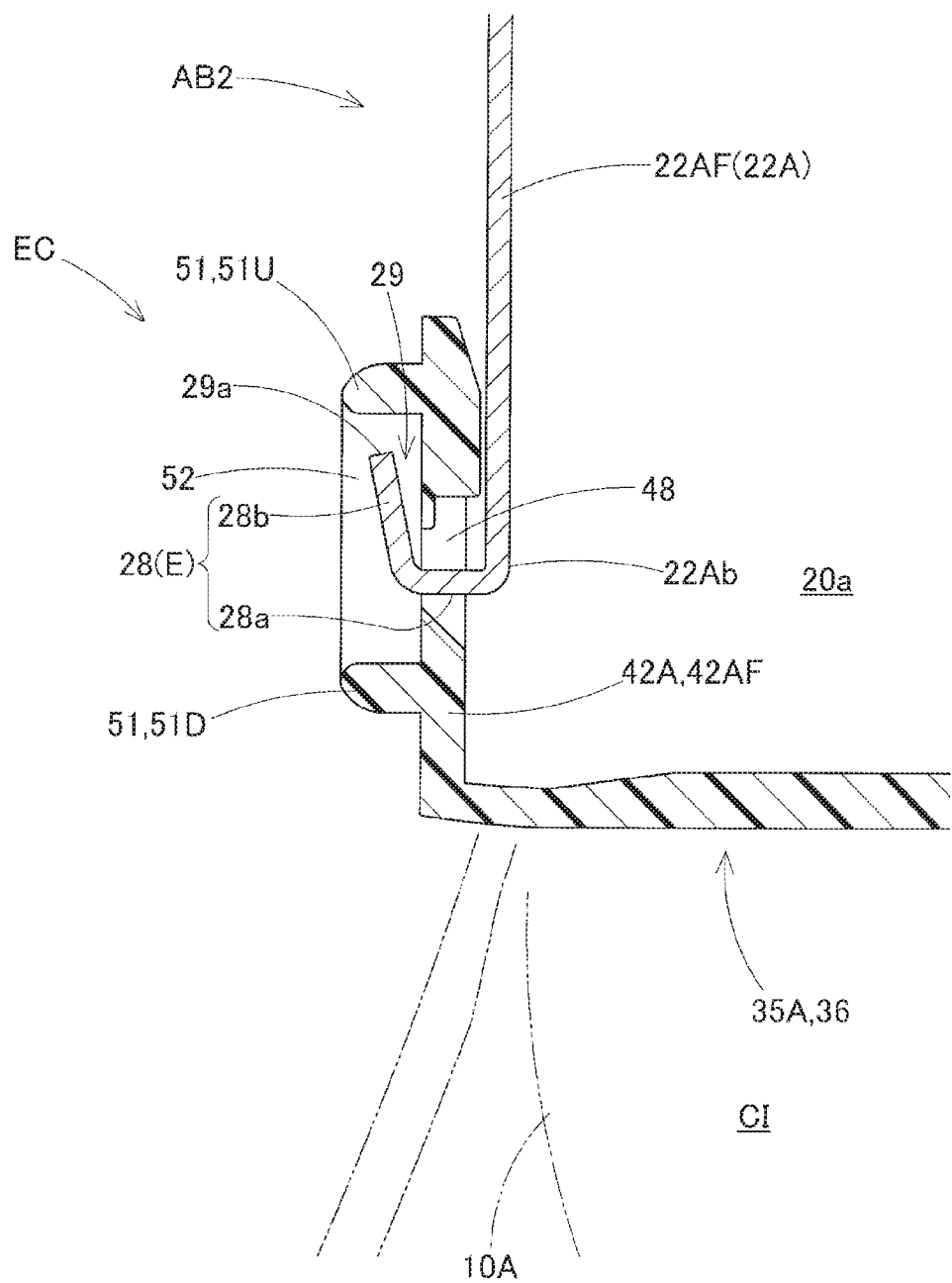

AIRBAG DEVICE

CROSS-REFERENCE TO RELATED APPLICATION(S)

This application is based upon and claims the benefit of priority from prior Japanese patent application No. 2017-158571, filed on Aug. 21, 2017, the entire contents of which are incorporated herein by reference.

BACKGROUND

1. Technical Field

The present invention relates to a type of airbag device disposed in the cabin interior of a vehicle and including a case storing a folded airbag and an airbag cover covering the folded airbag, the case connected to the airbag cover using engaging hooks provided in the case.

2. Background Art

As a type of airbag device, for example, a knee protection airbag device has been available that is equipped with: a case storing an inflatable airbag and having a protruding opening for allowing the airbag being inflated to protrude into a cabin interior; and an airbag cover covering the protruding opening and having door sections that are opened when pushed by the airbag being inflated (for example, refer to JP-A-2005-271774 and JP-A-2007-230344). The protruding opening is generally disposed so as to be opened rearward. Furthermore, the airbag cover is equipped with: a cabin interior side panel section provided with the door sections and exposed to the side of the cabin interior; and a side wall section extended forward from the rear face side of the cabin interior side panel section and connected to the case. For the connection of the airbag cover to the case, a plurality of engaging hooks inverted forward away from the protruding opening are disposed on the upper and lower wall sections of a peripheral wall section disposed around the protruding opening of the case, and the respective engaging hooks are inserted into engaging holes formed so as to pass through the side wall section of the airbag cover, protrude from the inside to the outside of the side wall section, and are engaged with the peripheral edges of the engaging holes.

Moreover, on the lower side of the side wall section of the airbag cover, a lower cover (refer to JP-A-2005-271774) separated from the airbag cover is disposed or an extension section (refer to JP-A-2007-230344) configured such that the lower edge side of the cabin interior side panel section is extended forward so as to be bent is disposed. The lower cover or the extension section is disposed to cover the tip end sections of the engaging hooks from the rear side to the lower side so that fingers or legs of an occupant do not make contact with the tip end sections of the engaging hooks protruding from the peripheral edges of the engaging holes provided on the lower side of the side wall section of the airbag cover.

However, in the case that the related-art airbag device is configured such that the lower cover separated from the airbag cover is used so as to cover the tip end sections of the engaging hooks on the lower side, the number of components increases and the number of processes also increases. This configuration is therefore not desirable. Furthermore, even in the case that the related-art airbag device is configured such that the extension section being bent from the rear side to the lower front side is provided on the side of the lower edge of the cabin interior side panel section of the airbag cover so as to cover the tip end sections of the engaging hooks on the lower side, a space for providing the extension section is required, and the degree of freedom in installing the airbag device is restricted. In the case of a configuration not provided with the lower cover or the extension section, the tip end sections of the engaging hooks are in a state of protruding from the peripheral edges of the engaging holes so as to be exposed to the side of the cabin interior on the lower face side of the side wall section of the airbag cover as a matter of course although the state of the protrusion cannot be visually recognized directly. Hence, there is a danger that objects to be interfered, such as fingers or legs of an occupant, may make contact with the tip end sections of the engaging hooks in an improper state such that the objects are caught thereby.

SUMMARY

It is an object of the present invention to solve the above-mentioned problems and to provide an airbag device capable of preventing objects to be interfered from improperly making contact with the engaging hooks exposed on the side of a cabin interior.

In order to achieve the object, according to an aspect of the invention, there is provided an airbag device comprising: a case which stores an inflatable airbag, and which includes a protruding opening that allows the airbag being inflated to protrude into a cabin interior, and a peripheral wall section around the protruding opening; an airbag cover which covers the protruding opening, and which includes a cabin interior side panel section provided with a door section that is opened when pushed by the airbag being inflated, and a side wall section extended from a rear face side of the cabin interior side panel section and connected to the peripheral wall section of the case; and an exposed connection portion which serves as a connection portion between the side wall section of the airbag cover and the peripheral wall section of the case, and which is exposed to a side of the cabin interior, wherein, at the exposed connection portion, the peripheral wall section includes an engaging hook that is inverted so as to be away from a side of the protruding opening, and the side wall section includes an engaging hole a peripheral edge of which is engaged with the engaging hook, the engaging hook is configured to pass through the engaging hole from an inside to an outside of the side wall section to be engaged with the side wall section, and a tip end section of the engaging hook is configured to protrude from the side wall section at the peripheral edge of the engaging hole so as to be exposed to the side of the cabin interior, and, at the peripheral edge of the engaging hole in the side wall section of the airbag cover at the exposed connection portion, a first rib capable of covering the tip end section of the engaging hook which protrudes from the engaging hole in a direction along an opening face of the engaging hole protrudes so as to have a height dimension nearly equal to or more than a height dimension of the tip end section of the engaging hook which protrudes from the engaging hole.

BRIEF DESCRIPTION OF THE DRAWINGS

FIG. 9 is a magnified vertical sectional view showing the knee protection airbag device shown in FIG. 8, the airbag device being mounted on the vehicle.

DETAILED DESCRIPTION OF EXEMPLARY EMBODIMENTS

An embodiment of the present invention will be described below on the basis of the accompanying drawings. An airbag device according to the embodiment is a knee protection airbag device (appropriately abbreviated as an airbag device) AB1, and the airbag device AB1 is disposed under a steering column 4, that is, on the vehicle front side of the lower limbs L of a driver M so as to be able to protect the knees K of the driver M, that is, an occupant sitting on a seat as shown in FIGS. 1 to 4.

The up-down direction, the left-right direction and the front-rear direction in this specification respectively correspond to the up-down direction, the left-right direction and the front-rear direction of a vehicle at the time when the airbag device AB1 is mounted on the vehicle.

Figure 1:
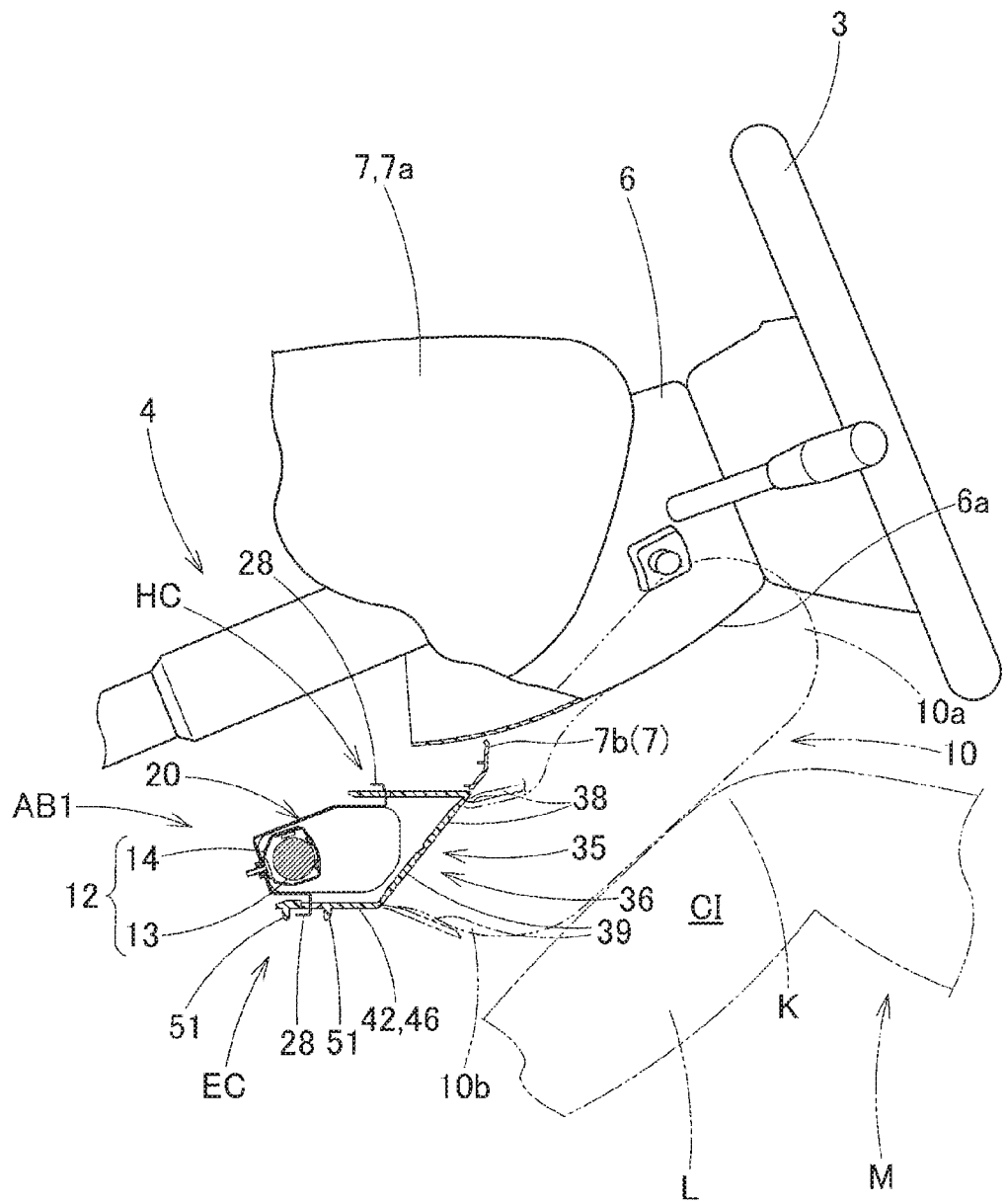
FIG. 1 is a schematic vertical sectional view showing a knee protection airbag device according to an embodiment of the present invention, the airbag device being mounted on a vehicle.
Figure 2:
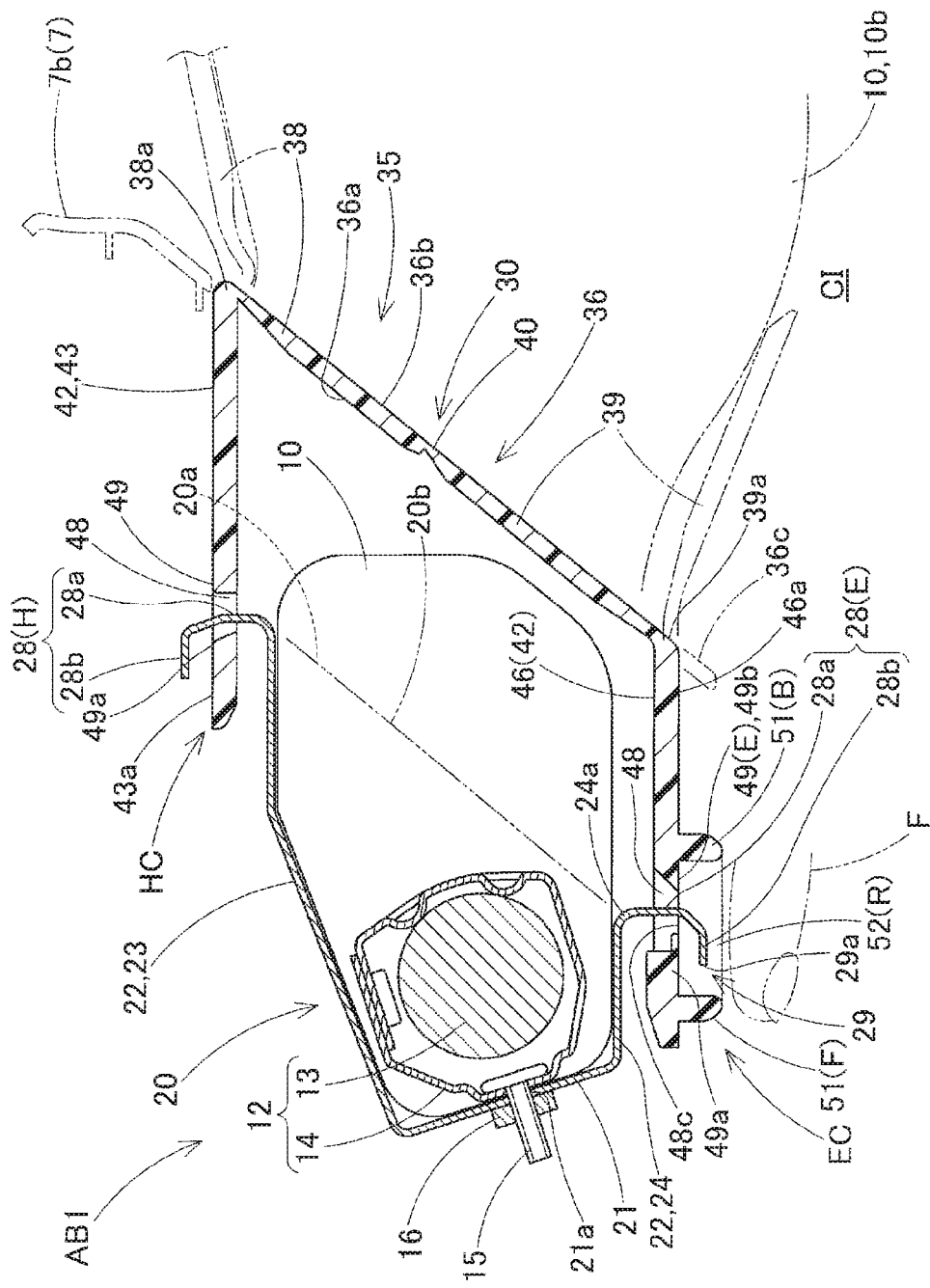
FIG. 2 is a magnified vertical sectional view showing the knee protection airbag device according to the embodiment, the airbag device being mounted on the vehicle.
Figure 3:
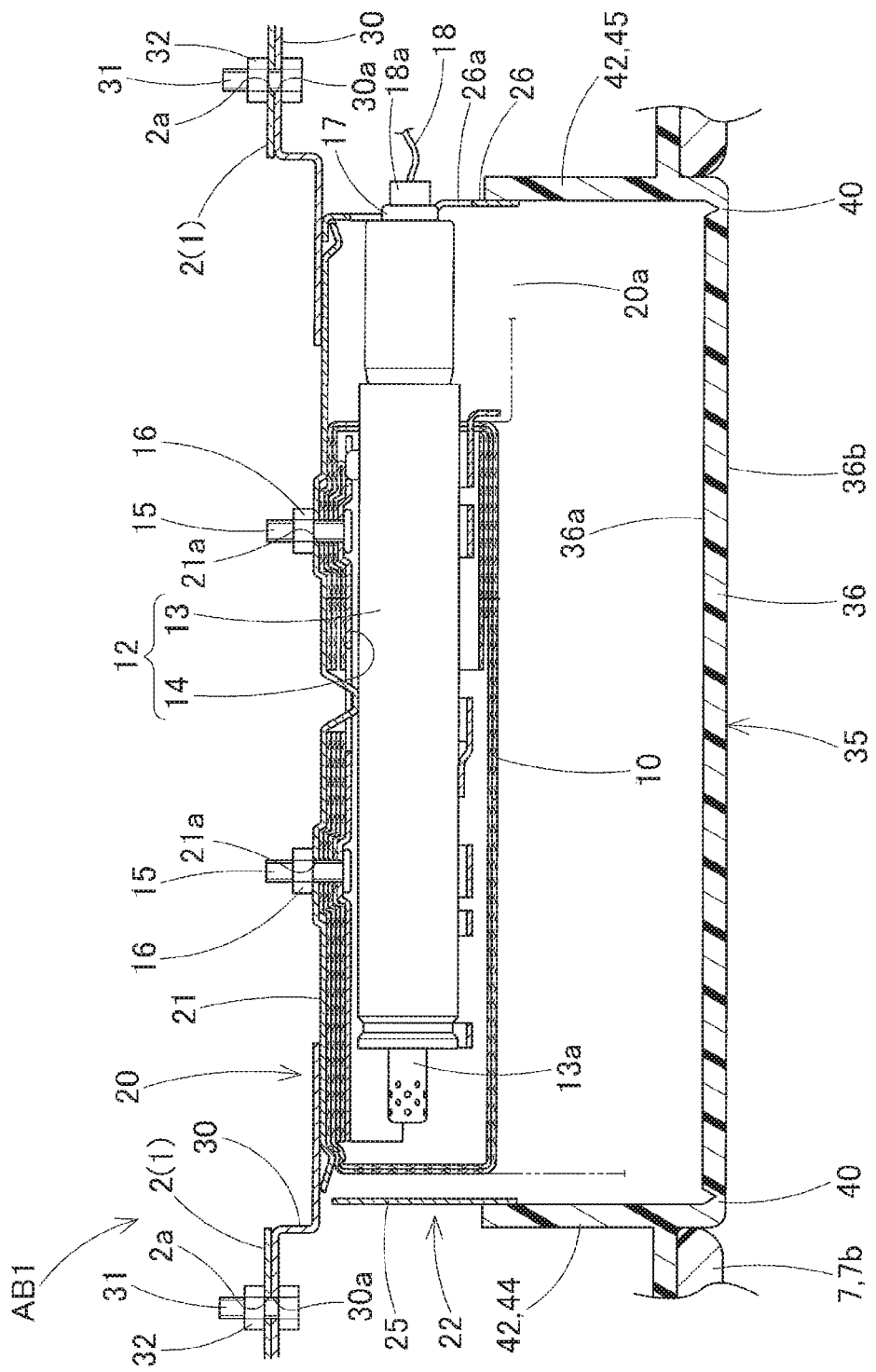
FIG. 3 is a magnified horizontal sectional view showing the knee protection airbag device according to the embodiment, the airbag device being mounted on the vehicle.
Figure 4:
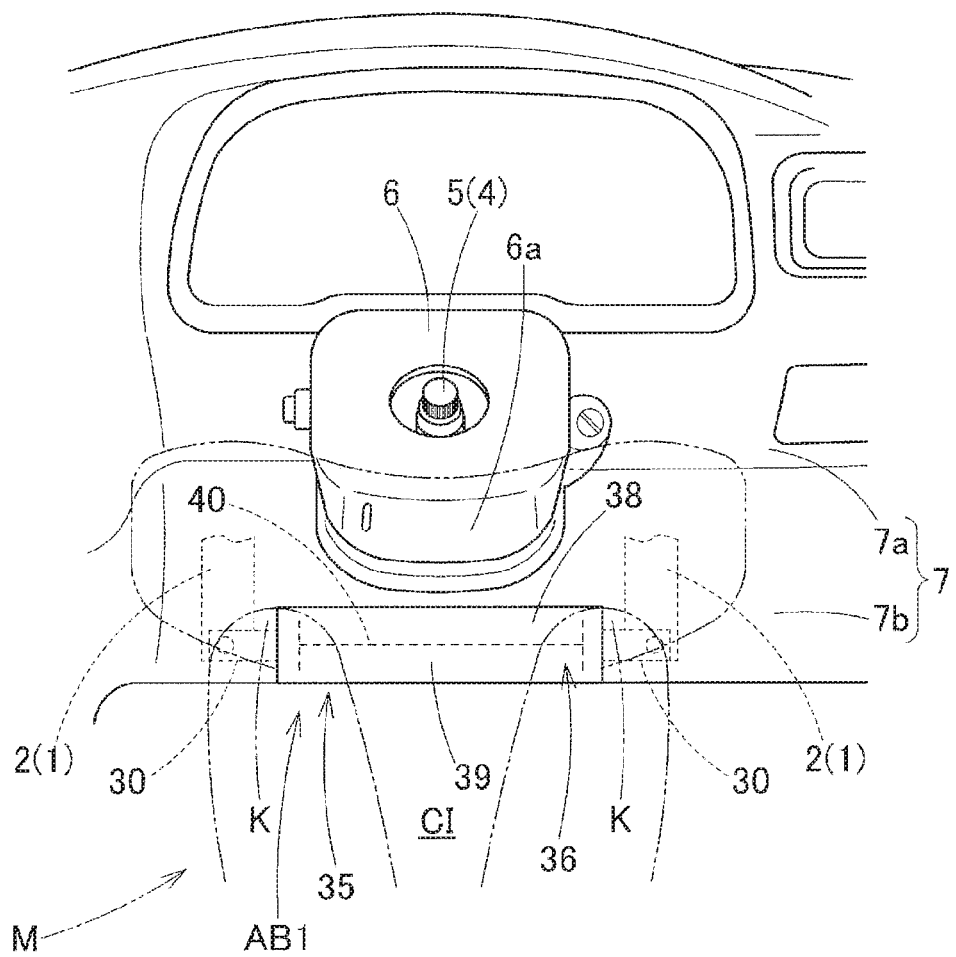
FIG. 4 is a schematic front view showing the knee protection airbag device according to the embodiment, the airbag device being mounted on the vehicle, as viewed from the rear side.

As shown in FIG. 1, the steering column 4 is equipped with a steering shaft 5 (see FIG. 4) connected to a steering wheel 3 and a column cover 6 on the outer peripheral side thereof. The column cover 6, having a nearly rectangular cylindrical shape, for example, and being made of a synthetic resin, is disposed along the axial direction of the steering shaft 5. In other words, the column cover 6 is disposed in a state of being inclined so as to rise upward to the rear side so that the vehicle front side of the column cover 6 is disposed downward and so that the vehicle rear side thereof is disposed upward. Furthermore, the lower face 6a of the portion of the column cover 6 protruding from an instrument panel 7 has a nearly rectangular shape and is formed into a curved shape rising upward to the rear side in the front-rear direction of the vehicle. The instrument panel 7 is equipped with an upper panel 7a enclosing the upper portion of the steering column 4 from both the left and right sides of the steering column 4 and a lower panel 7b (see FIGS. 3 and 4) enclosing both the left and right sides of the knee protection airbag device AB1.

As shown in FIGS. 1 to 4, the airbag device AB1 is equipped with a folded airbag 10, an inflator 12 supplying inflation gas to the airbag 10, a case 20 storing and holding the airbag 10 and the inflator 12 and provided with a protruding opening 20a for allowing the airbag 10 to protrude, and an airbag cover 35 covering the protruding opening 20a of the case 20.

The airbag 10 is formed into a nearly rectangular plate shape so as to allow the upper end 10a thereof to reach the area around the lower face 6a of the column cover 6 in the vicinity of the steering wheel 3 at the time of inflation completion, and is held in the case 20 using the inflator 12 stored inside the lower end 10b thereof.

The inflator 12 is equipped with a main body 13 having a circular cylindrical shape and a retainer 14 having a nearly circular cylindrical shape and being used to clamp and hold the main body 13. A connector section 17 to which lead wires 18 for inputting operation signals can be connected is provided on the side of the right end face of the main body 13, and a gas discharging section 13a for discharging inflation gas at the time of operation is disposed on the side of the left end section of the main body 13 away from the connector section 17.

The retainer 14 is provided with a plurality (two in the embodiment) of bolts 15 protruding rearward (see FIGS. 2 and 3), and the respective bolts 15 pass through the airbag 10 and the case 20 and are fastened with nuts 16, whereby the airbag 10 and the inflator 12 are installed and secured to the bottom wall section 21 of the case 20.

The case 20 is made of a metal (sheet metal) and has a nearly rectangular parallelepiped shape. On the rear end side, the case 20 is provided with the protruding opening 20a that opens in a rectangular shape to allow the airbag 10 protrude at the time of inflation, and the case 20 is further provided with a peripheral wall section 22 having a nearly rectangular cylindrical shape and extended forward from the peripheral edge of the protruding opening 20a and the bottom wall section 21 for blocking the forward side of the protruding opening 20a at the front end of the peripheral wall section 22.

Insertion holes 21a allowing the bolts 15 provided on the retainer 14 of the inflator 12 to be inserted are disposed in the bottom wall section 21. Furthermore, installing sections 30, 30 are disposed on the left and right sides of the bottom wall section 21. These installing sections 30, 30 are used to install and secure the airbag device AB1 to brackets 2 serving as vehicle body side members extended from an instrument panel reinforcement, not shown, on the side of a body (vehicle body) 1. Installing holes 30a pass through the respective installing sections 30. Moreover, the bolts 31 are inserted into the installing holes 30a and the installing holes 2a of the brackets 2, and nuts 32 are fastened to the bolts 31, whereby the airbag device AB1 is secured to the brackets 2 using the installing sections 30 of the case 20, thereby being installed and secured to the side of the body 1.

The peripheral wall section 22 of the case 20 is composed of an upper wall section 23 on the upper side, a lower wall section 24 on the lower side, a left wall section 25 on the left side and a right wall section 26 on the right side, and an insertion hole 26a is formed in the right wall side 26 so that the area around the connector section 17 to which the lead wires 18 for inputting operation signals to the inflator 12 are connected is inserted thereinto.

What's more, the upper wall section 23 and the lower wall section 24 are configured such that the opening face 20b of the protruding opening 20a is a face directed obliquely downward and such that the length of the upper wall section 23 is made longer than the length of the lower wall section 24 as the length dimensions extended forward from the bottom wall section 21 in the front-rear direction. Still further, engaging hooks 28 each having a J-shaped cross section are formed so as to be extended outward in the up-down direction from the rear peripheral edges 23a and 24a of the upper wall section 23 and the lower wall section 24 at the peripheral edge of the protruding opening 20a away from the protruding opening 20a and so as to be inverted to the front side. The engaging hooks 28, being plural in number (four in the embodiment), are arranged along the left-right direction at the rear edges 23a and 24a of the upper wall section 23 and the lower wall section 24.

Each engaging hook 28 has protruding piece sections 28a extended from the rear edges 23a and 24a of the upper wall section 23 and the lower wall section 24 of the peripheral wall section 22 in the up-down direction and hook sections 28b bent from the tip ends of the protruding piece sections 28a and extended forward. These engaging hooks 28 are engaged with the upper and lower connection wall sections 43 and 46 of the side wall section 42, described later, of the airbag cover 35. Furthermore, the protruding piece sections 28a pass through the engaging holes 48 in the connection wall sections 43 and 46 of the airbag cover 35, and the hook sections 28b can make contact with the front edge sections 49a of the peripheral edges 49 of the engaging holes 48 provided on the sides of the outer faces (the upper face and the lower face) 43a and 46a of the connection wall sections 43 and 46 so that the engaging hooks 28 can be prevented from coming off from the engaging holes 48.

Each of the tip end sections (protruding portions) 29 of the engaging hooks 28 protruding outward from the connection wall sections 43 and 46 has the hook section 28b and the protruding piece section 28a in the vicinity of the hook section 28b.

As shown in FIGS. 2 to 6, the airbag cover 35 has a cabin interior side panel section 36 made of a moldable synthetic resin, such as moldable olefinic thermoplastic elastomer, having a nearly rectangular plate shape and disposed so as to face the front side of the knees K of the driver M, and the airbag cover 35 also has the side wall section 42 extended forward in a rectangular cylindrical shape from the front face 36a of the cabin interior side panel section 36.

The cabin interior side panel section 36 is disposed so as to cover the protruding opening 20a of the case 20 and so as to expose the side of the rear face 36b thereof to the side of the cabin interior CI and is equipped with upper and lower door sections 38 and 39 that are opened when pushed by the airbag 10 being inflated. The upper door section 38 has a hinge section 38a that is used at the time of opening to the upper edge side, and the lower door section 39 has a hinge section 39a that is used at the time of opening to the lower edge side. Around the door sections 38 and 39, a thin-walled planned breaking section 40 that breaks when pushed by the airbag 10 being inflated is disposed in an H-shape as viewed from the front (on the rear side of the vehicle) of the cabin interior side panel section 36 (see FIG. 4). The hinge sections 38a and 38b are thin-walled integral hinges. The thin-walled shapes of the hinge sections 38a and 38b and the planned breaking section 40 are formed by concave sections recessed rearward from the side of the front face 36a of the cabin interior side panel section 36.

The side wall section 42 is formed into a rectangular cylindrical shape extended forward from the peripheries of the door sections 38 and 39 on the side of the front face 36a of the cabin interior side panel section 36 and has the connection wall sections 43 and 46 opposed to each other in the up-down direction and cover wall sections 44 and 45 opposed to each other in the left-right direction. The connection wall section on the upper side (upper connection wall section) 43 is disposed above the upper wall section 23 of the case 20 and is connected to the upper wall section 23 using the engaging hooks 28 extended from the upper wall section 23. Furthermore, the upper connection wall section 43 is provided with the plurality (four) of engaging holes 48 into which the respective engaging hooks 28 are inserted, and the engaging holes 48 are made to pass through the upper connection wall section 43 in the up-down direction and are arranged along the left-right direction. The connection wall section on the lower side (lower connection wall section) 46 is disposed below the lower wall section 24 of the case 20 and is connected to the lower wall section 24 using the engaging hooks 28 extended from the lower wall section 24. Moreover, the lower connection wall section 46 is to provided with the plurality (four) of engaging holes 48 into which the respective engaging hooks 28 are inserted, and the engaging holes 48 are made to pass through the lower connection wall section 46 in the up-down direction and are arranged in the left-right direction. The left cover wall section 44 is disposed on the outer peripheral side of the left wall section 25 of the case 20, and the right cover wall section 45 is disposed on the outer peripheral side of the right wall section 26 of the case 20 (see FIG. 3).

Each engaging hole 48 in the lower connection wall section 46 has a protrusion 48a having a nearly triangular plate shape on the rear face side of the inner peripheral face corresponding to the cross-sectional shape of the protruding piece section 28a of the engaging hook 28 and also has a protrusion 48b having a nearly rectangular plate shape on the front face side of the inner peripheral face so as to decrease the opening area of the engaging hole 48 without impairing the insertion easiness of the engaging hook 28.

Still further, on the lower face 46a of the lower connection wall section 46, ribs 51 and 52 are formed on the peripheral edges 49 of each engaging hole 48. In the case of the embodiment, the lower face 46a of the lower connection wall section 46 is exposed on the side of the cabin interior CI and on the front side of the lower limbs L of the driver M. The connection portion of the side wall section 42 (the lower connection wall section 46) of the airbag cover 35 and the peripheral wall section 22 (the lower wall section 24) of the case 20 at the peripheral edges 49 of the engaging holes 48 becomes an exposed connection portion EC being exposed to the side of the cabin interior CI. The connection portion of the upper connection wall section 43 of the airbag cover 35 and the upper wall section 23 of the case 20 becomes a shielded connection portion HC being hidden from the side of the cabin interior CI by the lower panel 7b of the instrument panel 7. Furthermore, the ribs 51 (51F and 51B) and 52 (52L and 52R) are disposed at the peripheral edges 49 of the engaging holes at the exposed connection portion EC.

The ribs 51 (51F and 51B) cover the tip end sections 29 of the engaging hooks 28E protruding from the lower connection wall section 46 at the exposed connection portion EC. The ribs are disposed on both the edges of the peripheral edges 49 of each engaging hole 48 opposed to each other in the front-rear direction along the inversion direction of the engaging hook 28E, that is, the front edge section 49a and the rear edge section 49b. The rib 51F on the front side and the rib 51B on the rear side are provided in the direction along the opening face 48c of the engaging hole 48 (in the direction along the lower face 46a of the lower connection wall section 46), protrude downward from the lower face 46a of the lower connection wall section 46 so as to be able to cover the tip end section 29 of the engaging hook 28E, and are disposed so as to be extended in the left-right direction.

The ribs 52 (52L and 52R) also cover the tip end sections 29 of the engaging hooks 28E protruding from the lower connection wall section 46 at the exposed connection portion EC. The ribs are disposed on both the edges of the peripheral edges 49 of each engaging hole 48 opposed to each other in the left-right direction orthogonal to the opposed direction (the front-rear direction) of the ribs 51F and 51B, that is, the left edge section 49c and the right edge section 49d (see FIG. 5), thereby being configured as second ribs. The rib 52L on the left side and the rib 52R on the right side are provided in the direction along the opening face 48c of the engaging hole 48 (in the direction along the lower face 46a of the lower connection wall section 46), protrude downward from the lower face 46a of the lower connection wall section 46 so as to be able to cover the tip end section 29 of the engaging hook 28E, and are disposed so as to be extended in the front-rear direction.

In the case of the embodiment, the ribs 51F, 52L, 51B and 52R are disposed so as to enclose the four sides, front, rear, left and right, of each engaging hole 48 at the peripheral edges 49 (49E) of the engaging hole and so as to be connected continuously to form a rectangular annular shape using corner sections 53 that mutually connect the ribs in a circular arc shape appropriately.

The height of these ribs 51 (51F and 51B) and 52 (52L and 52R) is set to a height dimension H1 nearly equal to or more than the height dimension H0 of the tip end section 29 of each engaging hook 28E protruding from the lower face 46a of the lower connection wall section 46. In the case of the embodiment, the height dimension H0 of the tip end section 29 of the engaging hook 28E protruding from the lower face 46a of the lower connection wall section 46 is set to approximately 4 mm, and the height dimension H1 of the ribs 51 and 52 is set to approximately 5.5 mm (see FIG. 6).

Figure 5:
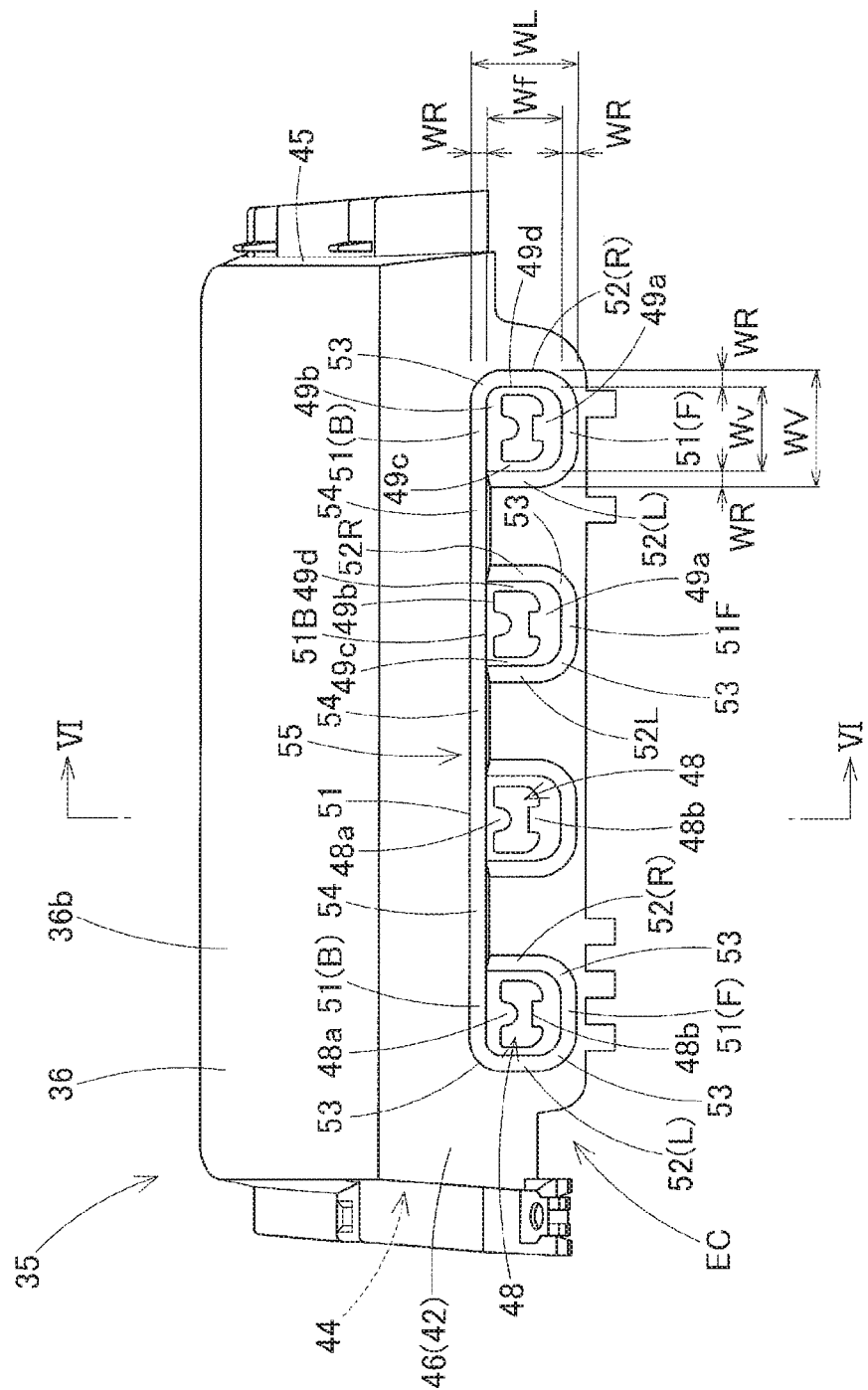
FIG. 5 is a schematic bottom view showing an airbag cover according to the embodiment.

Furthermore, in the case of the embodiment, the width dimension WL between the front and rear ribs 51 (51F and 51B) is set to approximately 32 mm, the width dimension WV between the left and right ribs 52 (52L and 52R) is set to approximately 33 ram, and the width dimension WR of the ribs 51 and 52 is set to approximately 4 mm (see FIG. 5). In other words, the tip end section 29 of the engaging hook 28 having a height dimension equal to or less than the height dimension of the ribs 51 and 52 is disposed inside a storage space RS enclosed with the ribs 51 and 52 and having a front-rear width Wf of approximately 24 mm and a left-right width Wv of approximately 25 mm.

Figure 6:
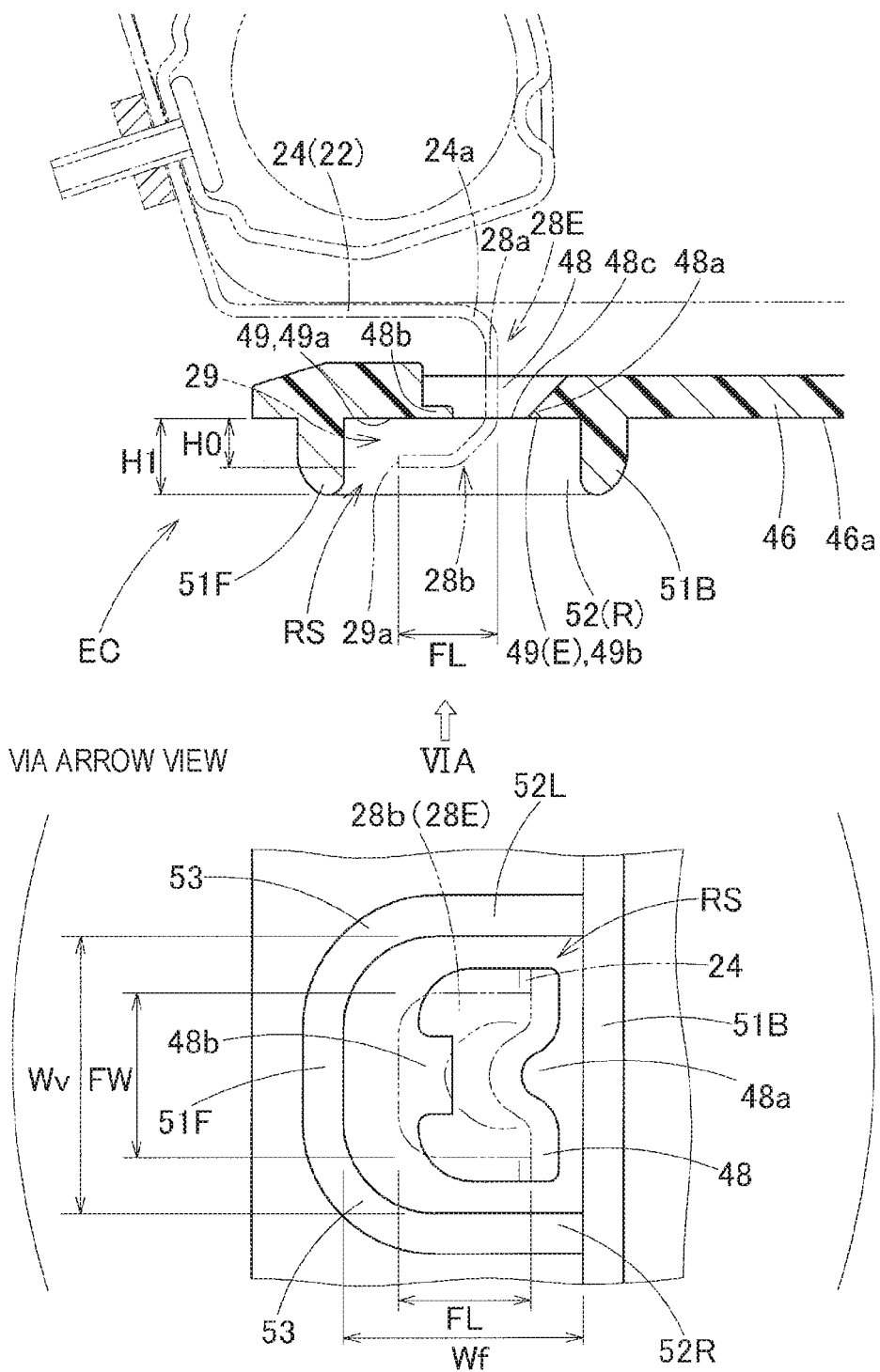
FIG. 6 is a magnified vertical sectional view showing the airbag cover according to the embodiment, taken on line VI-VI in FIG. 5.
Figure 7:
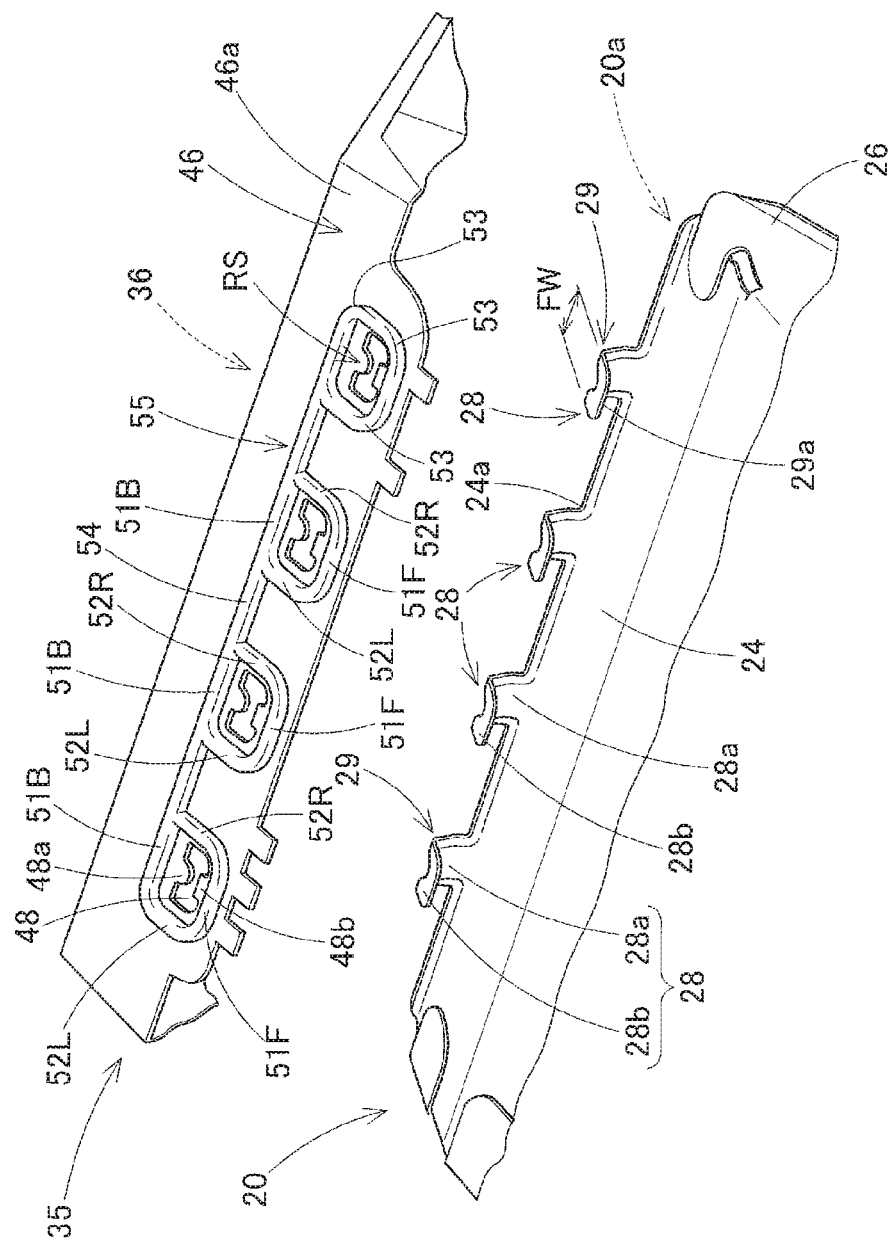
FIG. 7 is a schematic, partly perspective view showing the portion of the side wall section of the airbag cover according to the embodiment provided with ribs and the portion of the peripheral wall section of the case corresponding thereto.

In the case of the embodiment, the hook section 28b of the engaging hook 28 has a width dimension FW of approximately 15 mm and has a length dimension FL of approximately 10 mm (see FIGS. 6 and 7).

Moreover, in the case of the embodiment, the ribs 51B on the sides of the rear edge sections 49b of the peripheral edges 49 of the engaging holes 48 are made continuous along the arrangement direction of the engaging holes 48, that is, along the left-right direction, and are formed into a continuous rib 55. In other words, the respective ribs 51B of the peripheral edges 49 of the respective engaging holes 48 are mutually connected by connection sections 54 disposed in the left-right direction, whereby the one continuous rib 55 is formed by the four ribs 51B and the three connection sections 54 disposed between the ribs 51B.

These ribs 51 and 52 are formed so as to be integrally molded together with the side wall section 42 at the time when the airbag cover 35 is molded.

When the airbag cover 35 formed as described above is assembled as the airbag device AB1 and mounted on the vehicle, first, the airbag 10 in a state of accommodating the inflator 12 is stored is folded, and after the folding of the airbag 10, the airbag 10 is wrapped with a breakable wrapping film, not shown, to prevent folding collapse. The connector section 17 to which the lead wires 18 of the inflator 12 are connected and the bolts 15 are made to protrude from the wrapping film. And then, the airbag 10 is stored inside the case 20, the area around the connector section 17 of the inflator 12 is made to protrude from the insertion hole 26a, the bolts are made to protrude from the insertion holes 21a, and the nuts 16 are fastened to the protruding bolts 15, whereby the inflator 12 and the airbag 10 can be installed on the case 20. After that, the airbag cover 35 is connected to the case 20. For this connection, the respective engaging hooks 28 of the case 20 are inserted into the corresponding respective engaging holes 48 in the connection wall sections 43 and 46 of the airbag cover 35 and are engaged with the peripheral edges 49 of the engaging holes 48, whereby the airbag cover 35 is connected to the case 20 and the airbag device AB1 can be assembled.

After that, the installing sections 30, 30 are secured to the brackets 2 on the side of the body 1 using the bolts 31 and the nuts 32, whereby the knee protection airbag device AB1 can be mounted on the vehicle.

Furthermore, the connector 18a of the lead wires 18 is connected to the connector section 17 of the inflator 12, and the upper panel 7a and the lower panel 7b of the instrument panel 7 are assembled on the vehicle, whereby the work for mounting the knee protection airbag device AB1 according to the embodiment on the vehicle can be completed.

After the mounting of the airbag device AB1 on the vehicle, when an operation signal is input to the inflator 12, inflation gas is discharged from the gas discharging section 13a of the main body 13, the airbag 10 is inflated and breaks the wrapping film, not shown, and also breaks the planned breaking section 40, pushes and opens the door sections 38 and 39 of the airbag cover 35, and protrudes from the protruding opening 20a of the case 20 to the rear side of the vehicle. Still further, the airbag 10 is largely developed and inflated upward along the lower face 6a of the column cover 6 while unfolding the folding thereof, thereby being capable of protecting the knees K of the driver M (indicated by the two-dot chain lines in FIG. 1).

Moreover, in the knee protection airbag device AB1 according to the embodiment, at the exposed connection portion EC, the tip end sections 29 of the inverted engaging hooks 28E protruding from the side wall section 42 of the airbag cover 35 are hidden by the ribs 51F and 51B disposed at the peripheral edges 49E of the engaging holes. In other words, even if objects F to be interfered, such as fingers or legs (see FIG. 2), happen to make contact with the tip end sections 29 of the engaging hooks 28, the objects F to be interfered are positionally regulated by the ribs 51F and 51B disposed at the peripheral edges 49E of the engaging holes, whereby the objects F to be interfered are prevented from making contact with the tip end sections 29 of the engaging hooks, such as being caught thereby.

In particular, the height of the ribs 51F and 51B disposed at the peripheral edges 49 of the engaging holes 48 so as to cover the tip end sections 29 of the engaging hooks is set to the height dimension H1 so that the objects F to be interfered, such as fingers, do not make contact with the tip end sections 29 of the engaging hooks improperly, that is, the height dimension is simply made nearly equal to or more than the height dimension H0 of the tip end sections 29 of the engaging hooks protruding from the side wall section (lower connection wall section) 46 of the airbag cover 35, thereby preventing the objects F to be interfered from improperly making contact with the tip end sections 29 of the engaging hooks. Hence, in comparison with the related-art lower cover and the related-art extension section, the ribs are not bulky, can be disposed easily, and can be integrally formed simply at the time of forming of the airbag cover 35 itself.

Hence, in the airbag device AB1 according to the embodiment, the objects F to be interfered can be prevented from improperly making contact with the engaging hooks 28 exposed on the side of the cabin interior CI simply by disposing the ribs 51F and 51B at the peripheral edges 49 of the engaging holes.

Furthermore, in the airbag device AB1 according to the embodiment, the rib 51F is disposed on the side of the tip end face 29a of the tip end section 29 of each engaging hook 28 along the inversion direction of the tip end section of the engaging hook.

Hence, although the sides of the tip end faces 29a of the tip end sections 29 of the engaging hooks 28 protruding from the engaging holes 48 are configured so as to be apt to catch the objects F to be interfered, the objects F to be interfered, happening to make contact with the sides of the tip end faces 29a, are prevented from making contact with the tip end faces 29a by the ribs 51F located close to the tip end faces 29a, whereby the objects F to be interfered are prevented from improperly making contact with the tip end sections 29 of the engaging hooks 28, such as being caught thereby.

Moreover, in the airbag device AB1 according to the embodiment, the ribs 51F and 51B are disposed at the peripheral edges 49 of each engaging hole and in the vicinity of both the edge sections 49a and 49h that are opposed to each other in the direction along the inversion direction of the engaging hook 28 with the engaging hole 48 disposed therebetween.

Hence, although the sides of the tip end faces 29a of the tip end sections 29 of the engaging hooks 28 protruding from the engaging holes 48 are configured so as to be apt to catch the objects F to be interfered, the objects F to be interfered, happening to make contact with the sides of the tip end faces 29a, are prevented from making contact with the tip end faces 29a by the ribs 51F located close to the tip end faces 29a. Furthermore, even if the objects F to be interfered happen to enter deeper and make contact with the end sections 29 of the engaging hooks, the objects F to be interfered are positionally regulated by the ribs 51B on the other sides. As a result, the objects F to be interfered are positionally regulated by the ribs 51F and 51B arranged on both the sides of the peripheral edges 49 of the engaging holes, whereby the objects F to be interfered are prevented from making contact with the tip end sections 29 of the engaging hooks, such as being caught thereby.

In addition, in the embodiment, the protruding opening 20a of the case 20 is disposed on the front side of the lower limbs L of the occupant (driver) M sitting on a seat so that the airbag device serves as the knee protection airbag device AB1, and the engaging hooks 28 at the exposed connection portion EC are disposed so as to be inverted along the front-rear direction of the vehicle on the side of the vehicle away from the driver M.

In other words, in the embodiment, the protruding opening 20a of the case 20 is disposed rearward on the front side of the knees K of the driver M, and the engaging to hooks 28 at the exposed connection portion EC are inverted from the peripheral edge (rear edge) 24a of the protruding opening 20a at the lower wall section 24 of the peripheral wall section 22 of the case 20 downward and then forward in the front-rear direction of the vehicle on the side of the vehicle away from the driver M, whereby the ribs 51F and 51B can prevent the objects F to be interfered, such as fingers, from improperly making contact with the tip end sections 29 of the engaging hooks 28, such as from being caught thereby.

Still further, in the embodiment, on both the sides of the peripheral edges 49 of each engaging hole at the exposed connection portion EC in the direction orthogonal to the opposed direction of the ribs 51F and 51B opposed to each other, second ribs 52L and 52R capable of covering the tip end section 29 of the engaging hook protruding from each engaging hole 48 are disposed in the direction along the opening face 48c of the engaging hole 48.

Hence, in the embodiment, by virtue of the pair of first ribs 51F and 52B on both the sides of the peripheral edges 49 of the engaging hole opposed to each other in the direction along the inversion direction of the engaging hook 28 and the pair of second ribs 52L and 52R on both the sides of the peripheral edges 49 of the engaging hole in the direction orthogonal to the opposed direction of the first ribs 51F and 51B, the ribs (the first and second ribs) 51F, 51B, 52L and 52R are disposed so as to enclose the four sides of the peripheral edges 49 of each engaging hole 48E. Even if the objects F to be interfered, such as fingers, happen to move forward or rearward in the inversion direction of the engaging hooks 28E or happen to be dislocated leftward or rightward in the direction orthogonal to the inversion direction, the objects F to be interfered are regulated by the ribs (the first and second ribs) 51F, 51B, 52L and 52R enclosing the four sides of the peripheral edges 49 of the engaging holes 48E, whereby the objects F to be interfered are prevented from improperly making contact with the tip end sections 29 of the engaging hooks, such as being caught thereby.

In particular, in the embodiment, at the peripheral edges 49E of the engaging hole at the exposed connection portion EC, the ribs 51F and 51B opposed to each other in the direction along the inversion direction of the engaging hook 28 and the second ribs 52L and 52R are disposed so as to be connected continuously at the peripheral edges 49 of each engaging hole 48E.

Hence, in the embodiment, the first ribs 51F and 51B and the second ribs 52L and 52R are connected continuously so as to enclose the tip end section 29 of each engaging hook 28E at the peripheral edges 49 of each engaging hole 48E, whereby the objects F to be interfered, such as fingers, are further prevented from improperly making contact with the tip end sections 29 of the engaging hooks, such as being caught thereby.

Furthermore, in the embodiment, the engaging hooks 28E and the engaging holes 48 at the exposed connection portion EC are arranged at the corresponding lower wall section 24 of the peripheral wall section 22 of the case 20 and the corresponding lower connection wall section 46 of the side wall section 42 of the airbag cover 35 along the direction orthogonal to the opposed direction of the ribs 51F and 51B opposed to each other. Of the ribs 51F and 51B opposed to each other in the direction along the inversion direction of the engaging hook 28E, the ribs 51B on the side close to the protruding opening 20a are disposed so as to be connected continuously along the arrangement direction of the engaging holes 48, whereby the continuous rib 55 is configured.

Hence, in the embodiment, the peripheral edges 49 of the arranged engaging holes 48 are reinforced by the rib 55 extended continuously, and the rigidity of the peripheral edges 49E in the lower connection wall section 46 of the side wall section 42 provided with the arranged engaging holes 48 can be improved. Hence, at the time when the airbag 10 is developed and inflated, the peripheral edges 49 of the engaging holes 48 to be engaged with the engaging hooks 28E are not deformed, and their positions are not moved, whereby this configuration can contribute to quick opening of the door sections 38 and 39 of the airbag cover 35 by the pressure of the airbag 10 being inflated and to speedy development and inflation of the airbag 10. If the side wall section 42 of the airbag cover 35 is moved at the time when the airbag 10 is inflated, the opening timing of the door sections 38 and 39 is apt to be more delayed than that in the case that the side wall section is not moved, and this is not desirable.

Figure 8:
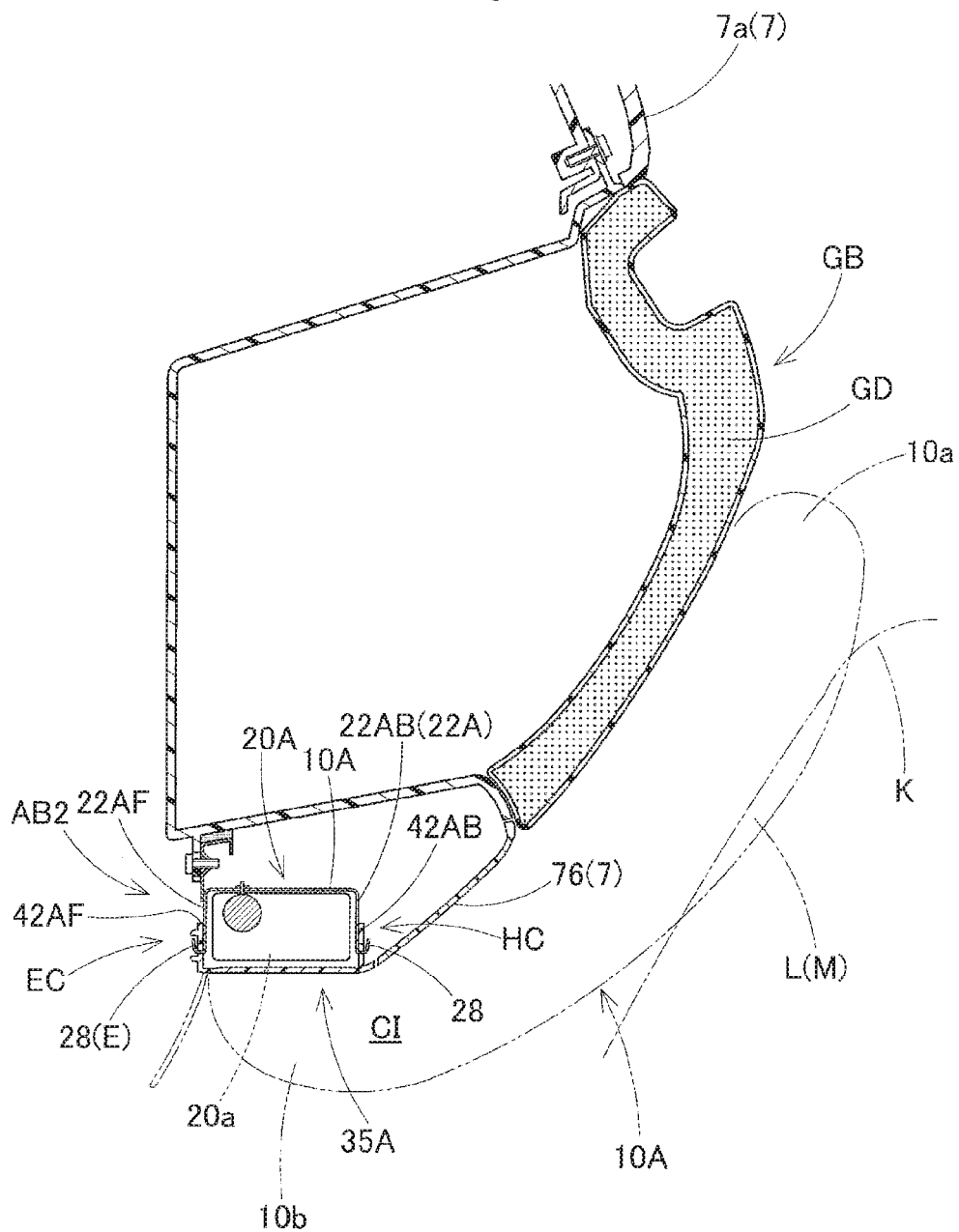
FIG. 8 is a schematic vertical sectional view showing a modification of the knee protection airbag device according to the embodiment, the airbag device being mounted on the vehicle.

Moreover, in the knee protection airbag device AB1 according to the embodiment, the airbag device in which the protruding opening 20a of the case 20 is disposed facing rearward on the front side of the knees K of the lower limbs L of the driver M, that is, an occupant, is taken as an example. However, like the knee protection airbag device AB2 shown in FIGS. 8 and 9, the protruding opening 20a of the case 20A thereof may be disposed facing downward on the front side of the lower limbs L of the occupant M sitting on the front passenger seat. In this case, the engaging hooks 28E at the exposed connection portion EC are inverted from the peripheral edge (lower edge) 22Ab of the protruding opening 20a in the peripheral wall section 22A of the case 20A forward in the front-rear direction of the vehicle on the side of the vehicle away from the occupant M and then upward, whereby the objects to be interfered, such as fingers, can be prevented from improperly making contact with the tip end sections 29 of the engaging hooks 28E, such as being caught thereby, by using ribs 51U and 51D.

In this airbag device AB2, the airbag 10A being inflated protrudes downward from the case 20A and is developed and inflated rearward and upward along the door GD of the glove box GB of the vehicle. In the airbag device AB2, the side wall section 42A of the airbag cover 35A thereof is disposed so as to enclose the periphery of the peripheral wall section 22A of the case 20A, the peripheral wall section 22A being formed into a nearly rectangular cylindrical shape. The front and rear connection wall sections 42AF and 42AB are engaged with the engaging hooks 28 using the engaging holes 48, thereby being connected to the case 20A. Furthermore, the area around the engaging holes 48 in the connection wall section 42AB on the rear side becomes a shielded connection portion HC being shielded by the glove box GB and the lower panel 7b, the area around the engaging holes 48 in the connection wall section 42AF on the front side becomes an exposed connection portion EC communicating with the side of the cabin interior IC, and the ribs 51U and MD are disposed at the exposed connection portion EC. In addition to the ribs 51U and 51D disposed on the upper and lower sides of the peripheral edges 49 of the engaging holes 48, ribs 52 (see FIG. 9) disposed on both the right and left sides of the peripheral edges 49 of the engaging holes 48 are also disposed so as to enclose the four sides of the engaging holes 48. Still further, like the continuous rib 55 according to the embodiment, the ribs 51D are provided continuously in the left-right direction along the arrangement direction (the left-right direction) of the engaging holes 48.

From the viewpoint of properly capable of preventing the objects F to be interfered, such as fingers, from improperly making contact with the engaging hooks 28E, the front-rear width Wf of the storage space RS between the opposed ribs 51 (F, B) is desirably approximately 1.1 to 3 times the front-rear direction length FL of the hook section 28b of the engaging hook 28E; if the front-rear width Wf is too large, proper contact prevention cannot be attained, and if the front-rear width Wf is too small, the area of the engaging hole 48 into which the engaging hook 28E is inserted and the area of the peripheral edges 49 of the engaging hole 48 are hardly obtained.

Similarly, the left-right width $W_V$ of the storage space RS between the pair of ribs 52 (L, R) disposed in the direction orthogonal to the opposed direction of the opposed ribs 51 (F and B) is desirably approximately 1.0 to 2.0 times the left-right direction width dimension FW of the hook section 28b of the engaging hook 28E; if the left-right width $W_V$ is too large, proper contact prevention cannot be attained, and if the left-right width $W_V$ is too small, the work for engaging the engaging hooks 28E with the engaging holes 48 is obstructed.

Furthermore, the height dimension H1 of the ribs 51 and 52 is desirably nearly equal to or more than the height dimension H0 of the tip end section 29 of the engaging hook 28E. The height dimension is preferably approximately 0.9 to 2.5 times, further preferably 1.0 to 1.6 times the height dimension H0 of the tip end section 29; if the height dimension is too large, the material of the airbag cover 35 is wasted.

Still further, in the embodiment, the configuration in which the connection portion between the lower connection wall section 46 of the side wall section 42 engaged with the engaging hooks 28E and the cabin interior side panel section 36 is not provided with an edge section protruding from the cabin interior side panel section 36 is taken as an example. However, if there is a sufficient space, the edge section 36c of the cabin interior side panel section 36 may be provided so as to be extended as indicated by the two-dot chain line in FIG. 2.

According to an aspect of the invention, there is provided an airbag device comprising: a case which stores an inflatable airbag, and which includes a protruding opening that allows the airbag being inflated to protrude into a cabin interior, and a peripheral wall section around the protruding opening; an airbag cover which covers the protruding opening, and which includes a cabin interior side panel section provided with a door section that is opened when pushed by the airbag being inflated, and a side wall section extended from a rear face side of the cabin interior side panel section and connected to the peripheral wall section of the case; and an exposed connection portion which serves as a connection portion between the side wall section of the airbag cover and the peripheral wall section of the case, and which is exposed to a side of the cabin interior, wherein, at the exposed connection portion, the peripheral wall section includes an engaging hook that is inverted so as to be away from a side of the protruding opening, and the side wall section includes an engaging hole a peripheral edge of which is engaged with the engaging hook, the engaging hook is configured to pass through the engaging hole from an inside to an outside of the side wall section to be engaged with the side wall section, and a tip end section of the engaging hook is configured to protrude from the side wall section at the peripheral edge of the engaging hole so as to be exposed to the side of the cabin interior, and, at the peripheral edge of the engaging hole in the side wall section of the airbag cover at the exposed connection portion, a first rib capable of covering the tip end section of the engaging hook which protrudes from the engaging hole in a direction along an opening face of the engaging hole protrudes so as to have a height dimension nearly equal to or more than a height dimension of the tip end section of the engaging hook which protrudes from the engaging hole.

With the airbag device according to the present invention, at the exposed connection portion, the tip end section of the inverted engaging hook which protrudes from the side wall section of the airbag cover is hidden by the first rib disposed at the peripheral edge of the engaging hole. In other words, even if objects to be interfered, such as fingers or legs, happen to make contact with the tip end section of the engaging to hook, the objects to be interfered are positionally regulated by the first rib disposed at the peripheral edge of the engaging hole, whereby the objects to be interfered are prevented from making contact with the tip end section of the engaging hook, such as being caught thereby.

In particular, the height of the first rib disposed at the peripheral edge of the engaging hole so as to cover the tip end section of the engaging hook is set to the height dimension so that the objects to be interfered, such as fingers, do not make contact with the tip end section of the engaging hook improperly, that is, the height dimension is simply made nearly equal to or more than the height dimension of the tip end section of the engaging hook which protrudes from the side wall section of the airbag cover, thereby preventing the objects to be interfered from improperly making contact with the tip end section of the engaging hook. Hence, in comparison with the related-art lower cover and the related-art extension section, the first rib is not bulky, can be disposed easily, and can be integrally formed simply at the time of forming of the airbag cover itself.

Hence, in the airbag device according to the present invention, the objects to be interfered can be prevented from improperly making contact with the engaging hook exposed on the side of the cabin interior simply by disposing the first rib at the peripheral edge of the engaging hole.

The first rib may be disposed on a side of a tip end face of the tip end section of the engaging hook along an inversion direction of the tip end section of the engaging hook.

The reason is that, although the side of the tip end face of the tip end section of the engaging hook which protrudes from the engaging hole is configured so as to be apt to catch the objects to be interfered, the objects to be interfered, happening to make contact with the side of the tip end face, is prevented from making contact with the tip end face by the first rib located close to the tip end face, whereby the objects to be interfered are prevented from improperly making contact with the tip end section of the engaging hook, such as being caught thereby.

The first rib may include ribs which are disposed at the peripheral edge of the engaging hole and in a vicinity of both edge sections that are opposed to each other in a direction along an inversion direction of the engaging hook with the engaging hole disposed therebetween.

The reason is that, although the side of the tip end face of the tip end section of the engaging hook which protrudes from the engaging hole is configured so as to be apt to catch the objects to be interfered, the objects to be interfered, happening to make contact with the side of the tip end face, are prevented from making contact with the tip end face by the rib located close to the tip end face. Furthermore, even if the objects to be interfered happen to enter deeper and make contact with the end section of the engaging hook, the objects to be interfered are positionally regulated by the rib on the other side. As a result, the objects to be interfered are positionally regulated by the ribs arranged on both the sides of the peripheral edge of the engaging hole, whereby the objects to be interfered are prevented from making contact with the tip end section of the engaging hook, such as being caught thereby.

The protruding opening of the case may be disposed on a front side of lower limbs of an occupant sitting on a seat so that the airbag device serves as a knee protection airbag device, and the engaging hook at the exposed connection portion may be disposed so as to be inverted along a front-rear direction of a vehicle on a side away from the occupant.

In other words, as the airbag device according to the present invention, the knee protection airbag device can be taken as an example. In that case, the protruding opening of the case is disposed rearward or downward on the front side of the knees of the occupant (including the driver), and the engaging hook at the exposed connection portion is inverted from the peripheral edge of the protruding opening at the peripheral wall section of the case downward and then forward in the front-rear direction of the vehicle on the side away from the occupant or inverted from the peripheral edge forward in the front-rear direction of the vehicle on the side away from the occupant and then upward, whereby the ribs can prevent the objects to be interfered, such as fingers, from improperly making contact with the tip end section of the engaging hook, such as from being caught thereby.

On both sides of the peripheral edge of the engaging hole at the exposed connection portion in a direction orthogonal to an opposed direction of the ribs opposed to each other, second ribs capable of covering the tip end section of the engaging hook which protrudes from the engaging hole in a direction along the opening face of the engaging hole may protrude so as to have a height dimension nearly equal to or more than the height dimension of the tip end section of the engaging hook which protrudes from the engaging hole.

With this configuration, by virtue of the pair of ribs (first ribs) on both the sides of the peripheral edge of the engaging hole opposed to each other in the direction along the inversion direction of the engaging hook and the pair of second ribs on both the sides of the peripheral edge of the engaging hole in the direction orthogonal to the opposed direction of the first ribs, the ribs (the first and second ribs) are disposed so as to enclose the four sides of the peripheral edge of the engaging hole. Even if the objects to be interfered, such as fingers, happen to move forward or rearward in the inversion direction of the engaging hook or happen to be dislocated leftward or rightward in the direction orthogonal to the inversion direction, the objects to be interfered are regulated by the ribs (the first and second ribs) enclosing the four sides of the peripheral edge of the engaging hole, whereby the objects to be interfered are prevented from improperly making contact with the tip end section of the engaging hook, such as being caught thereby.

At the peripheral edge of the engaging hole at the exposed connection portion, the ribs opposed to each other and the second ribs may be disposed so as to be connected continuously at the peripheral edge of the engaging hole.

With this configuration, the first ribs and the second ribs are connected continuously so as to enclose the tip end section of the engaging hook at the peripheral edge of engaging hole, whereby the objects to be interfered, such as fingers, are further prevented from improperly making contact with the tip end section of the engaging hook, such as being caught thereby.

Engaging hooks and engaging holes at the exposed connection portion may be arranged at the corresponding peripheral wall section of the case and the corresponding to side wall section of the airbag cover along a direction orthogonal to an opposed direction of the ribs opposed to each other, and, of the ribs opposed to each other in the direction along the inversion direction of the engaging hook, the ribs on a side close to the protruding opening may be disposed so as to be connected continuously along an arrangement direction of the engaging holes.

With this configuration, the peripheral edges of the arranged engaging holes are reinforced by the rib extended continuously, and the rigidity of the peripheral edges of the engaging holes in the side wall section provided with the engaging holes can be improved. Hence, at the time when the airbag is developed and inflated, the peripheral edges of the engaging holes to be engaged with the engaging hooks are not deformed, and their positions are not moved, whereby this configuration can contribute to quick opening of the door sections of the airbag cover by the pressure of the airbag being inflated and to speedy development and inflation of the airbag. If the side wall section of the airbag cover is moved at the time when the airbag is inflated, the opening timing of the door sections is apt to be more delayed than that in the case that the side wall section is not moved, and this is not desirable.

What is claimed is:

1. An airbag device comprising:
   a case which stores an inflatable airbag, and which includes a protruding opening that allows the airbag being inflated to protrude into a cabin interior, and a peripheral wall section around the protruding opening;
   an airbag cover which covers the protruding opening, and which includes a cabin interior side panel section provided with a door section that is opened when pushed by the airbag being inflated, and a side wall section extended from a rear face side of the cabin interior side panel section and connected to the peripheral wall section of the case; and
   an exposed connection portion which serves as a connection portion between the side wall section of the airbag cover and the peripheral wall section of the case, and which is exposed to a side of the cabin interior, wherein,
   at the exposed connection portion, the peripheral wall section includes an engaging hook that is inverted so as to be away from a side of the protruding opening, and the side wall section includes an engaging hole a peripheral edge of which is engaged with the engaging hook,
   the engaging hook is configured to pass through the engaging hole from an inside to an outside of the side wall section to be engaged with the side wall section, and a tip end section of the engaging hook is configured to protrude from the side wall section at the peripheral edge of the engaging hole so as to be exposed to the side of the cabin interior, and,
   at the peripheral edge of the engaging hole in the side wall section of the airbag cover at the exposed connection portion, a first rib capable of covering the tip end section of the engaging hook which protrudes from the engaging hole in a direction along an opening face of the engaging hole protrudes so as to have a height dimension nearly equal to or more than a height dimension of the tip end section of the engaging hook which protrudes from the engaging hole, wherein
   the first rib includes ribs which are disposed at the peripheral edge of the engaging hole and in a vicinity of both edge sections that are opposed to each other in a direction along an inversion direction of the engaging hook with the engaging hole disposed therebetween.

2. The airbag device according to claim 1, wherein the first rib is disposed on a side of a tip end face of the tip end section of the engaging hook along an inversion direction of the tip end section of the engaging hook.

3. The airbag device according to claim 1, wherein the protruding opening of the case is disposed on a front side of lower limbs of an occupant sitting on a seat so that the airbag device serves as a knee protection airbag device, and
the engaging hook at the exposed connection portion is disposed so as to be inverted along a front-rear direction of a vehicle on a side away from the occupant.

4. The airbag device according to claim 1, wherein,
on both sides of the peripheral edge of the engaging hole at the exposed connection portion in a direction orthogonal to an opposed direction of the ribs opposed to each other, second ribs capable of covering the tip end section of the engaging hook which protrudes from the engaging hole in a direction along the opening face of the engaging hole protrudes so as to have a height dimension nearly equal to or more than the height dimension of the tip end section of the engaging hook which protrudes from the engaging hole.

5. The airbag device according to claim 4, wherein,
at the peripheral edge of the engaging hole at the exposed connection portion, the ribs opposed to each other and the second ribs are disposed so as to be connected continuously at the peripheral edge of the engaging hole.

6. The airbag device according to claim 1, wherein engaging hooks and engaging holes at the exposed connection portion are arranged at the corresponding peripheral wall section of the case and the corresponding side wall section of the airbag cover along a direction orthogonal to an opposed direction of the ribs opposed to each other, and,
of the ribs opposed to each other in the direction along the inversion direction of the engaging hook, the ribs on a side close to the protruding opening are disposed so as to be connected continuously along an arrangement direction of the engaging holes.

7. An airbag device comprising:
a case which stores an inflatable airbag, and which includes a protruding opening that allows the airbag being inflated to protrude into a cabin interior, and a peripheral wall section around the protruding opening;
an airbag cover which covers the protruding opening, and which includes a cabin interior side panel section provided with a door section that is opened when pushed by the airbag being inflated, and a side wall section extended from a rear face side of the cabin interior side panel section and connected to the peripheral wall section of the case; and
an exposed connection portion which serves as a connection portion between the side wall section of the airbag cover and the peripheral wall section of the case, and which is exposed to a side of the cabin interior, wherein,
at the exposed connection portion, the peripheral wall section includes an engaging hook that is inverted so as to be away from a side of the protruding opening, and the side wall section includes an engaging hole a peripheral edge of which is engaged with the engaging hook,
the engaging hook is configured to pass through the engaging hole from an inside to an outside of the side wall section to be engaged with the side wall section, and a tip end section of the engaging hook is configured to protrude from the side wall section at the peripheral edge of the engaging hole so as to be exposed to the side of the cabin interior, and, at the peripheral edge of the engaging hole in the side wall section of the airbag cover at the exposed connection portion, a first rib capable of covering the tip end section of the engaging hook which protrudes from the engaging hole in a direction along an opening face of the engaging hole protrudes so as to have a height dimension nearly equal to or more than a height dimension of the tip end section of the engaging hook which protrudes from the engaging hole, wherein the first rib protrudes from the airbag cover.

8. The airbag device according to claim 7, wherein the first rib is disposed on a side of a tip end face of the tip end section of the engaging hook along an inversion direction of the tip end section of the engaging hook.

9. The airbag device according to claim 7, wherein the protruding opening of the case is disposed on a front side of lower limbs of an occupant sitting on a seat so that the airbag device serves as a knee protection airbag device, and the engaging hook at the exposed connection portion is disposed so as to be inverted along a front-rear direction of a vehicle on a side away from the occupant.

* * * * *